United States Patent [19]

Taguchi

[11] Patent Number: 4,792,111
[45] Date of Patent: Dec. 20, 1988

[54] FORMING DIE FOR FORMING A VEHICLE SEAT FOAM CUSHION MEMBER WITH A PILE-TYPE FASTENER

[75] Inventor: Katsumi Taguchi, Akishima, Japan

[73] Assignee: Tachi-S Co., Tokyo, Japan

[21] Appl. No.: 40,620

[22] Filed: Apr. 21, 1987

[51] Int. Cl.⁴ .............................................. B29C 33/14
[52] U.S. Cl. ......................................... 249/83; 249/91; 264/275; 425/4 R; 425/117; 425/127; 425/817 R
[58] Field of Search ................ 249/83, 91; 264/275, 264/277, 257, 46.4, 45.3; 425/4 R, 110, 117, 127, 817 R, 17 R

[56] References Cited

U.S. PATENT DOCUMENTS

| | | | |
|---|---|---|---|
| 3,111,365 | 11/1963 | Hood et al. | 249/91 |
| 3,124,627 | 3/1964 | Hood | 249/91 |
| 3,264,382 | 8/1966 | Angell et al. | 249/91 |
| 4,524,037 | 6/1985 | Marc | 425/817 R |
| 4,544,126 | 10/1985 | Melchert | 249/83 |

FOREIGN PATENT DOCUMENTS 2030550 6/1970 Fed. Rep. of Germany ...... 425/127

Primary Examiner—Willard Hoag
Attorney, Agent, or Firm—Oldham & Oldham Co.

[57] ABSTRACT

A forming die for forming a vehicle seat foam cushion member integrally on its surface with a pile-type fastener adapted to be engageable with a mating pile-type fastener provided on the back surface of a top cover member associated with the seat. In the forming die, there is formed a recessed groove, in which resiliently and frictionally secured is a base plate with an engageable member fixed thereto. The engageable member is capable of removable engagement with the pile-type fastener which is to be integrally provided on the cushion member.

8 Claims, 2 Drawing Sheets

F I G. 1
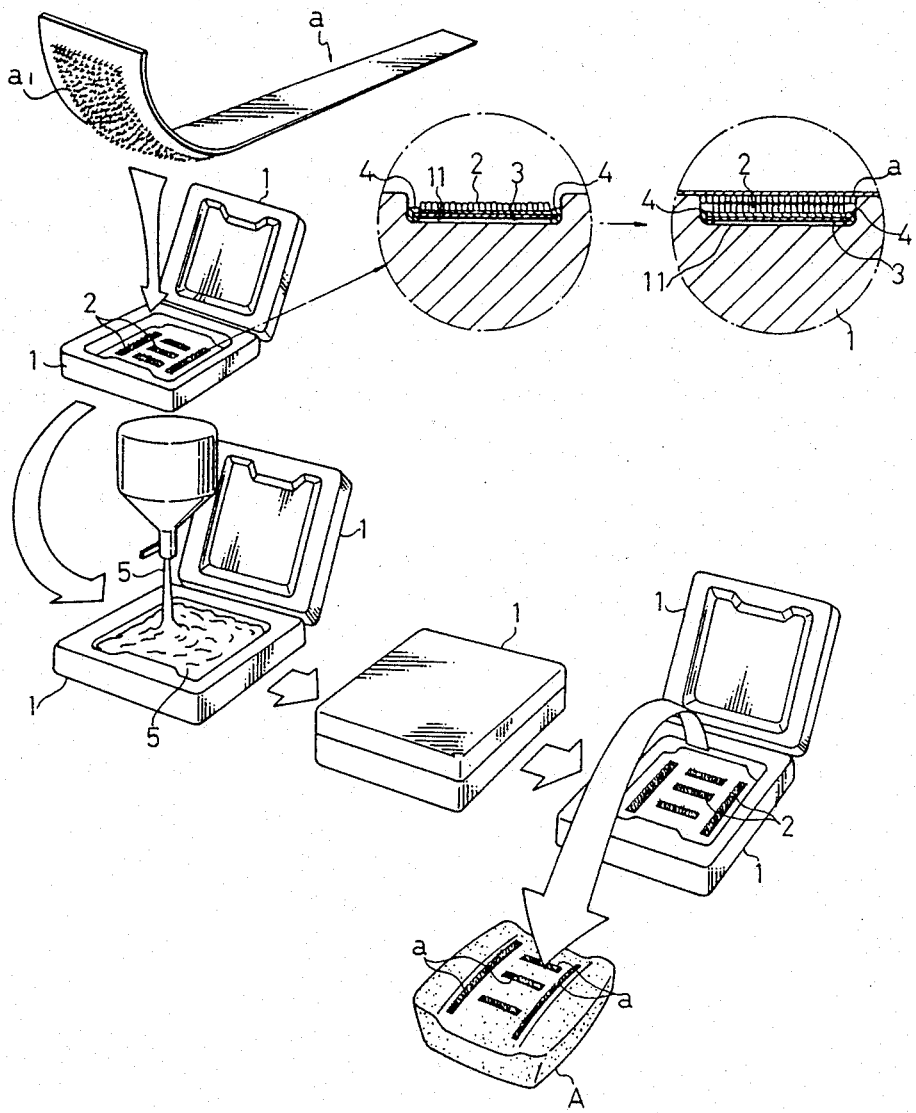

FORMING DIE FOR FORMING A VEHICLE SEAT FOAM CUSHION MEMBER WITH A PILE-TYPE FASTENER

BACKGROUND OF THE INVENTION

1. Field of the Invention

The present invention relates to a forming die for forming a cushion member used in the seat of vehicle or automobile and so forth, and in particular relates to a forming die for forming a foam cushion member on its surface with a female pile-type fastener adapted to be engageable with a mating male one provided on the back surface of a top cover member associated with the seat.

2. Description of the Prior Art

There has been such a cushion member which is formed by foaming a foamable material (polyurethane, for example) integrally on its surface with a female pile-type fastener (a loop part of a hook-and-loop fastener, for example). What is meant by such pile-type fastener as defined hereby includes all kinds of hook-and-loop fasteners known as "Velcro" (registered trade mark) and all similar types of fasteners, or the like. Referring to FIG. 2 in the accompanying drawings, is illustrative of this kind of resultant cushion member (A) with a plurality of female pile-type fasteners (a) integrally provided therein. As seen in this figure, a corresponding number of plural male pile-type fasteners (a') (a hook part of the hook-and-loop fastener, for example) are provided on the back surface of a top cover member (B). Upon engaging the male pile-type fasteners with the female ones, the top cover member (B) is brought to a close contact with the cushion member (A), so that the former is stretched in conformity with the contour of the latter. Accordingly, this kind of seat construction is advantageous in that it is far improved in its assembling process as compared with a seat of such type wherein a top cover member is fixed to a cushion member by inserting a securing string provided on the back surface of the top cover member into the cushion member.

Conventionally, the above-described cushion member with the plural female pile-type fasteners (a) has been formed by means of a forming die of such construction that there is embedded a permanent magnet in a recessed groove formed in the die for the purpose of securing a pile-type fastener to the die under the influence of magnetic force. According to this conventional die, after the pile-type fastener has been secured by the magnet, a foam material in fluid is injected into the forming die, and then a foaming is effected within the die so as to form a predetermined shape of cushion member together with the pile-type fastener.

Such conventional forming die, however, involves the following drawbacks: (a) A material to be attracted to the magnet in the die, such as a ferrous metallic material, needs to be provided in the pile-type fastener for magnetically securing the pile-type fastener to the die. Consequently, assembling the fastener requires rather troublesome steps with high costs involved, and further, the magnetically attractable material (ferrous metallic material) is of hard nature and provided in the fastener on the cushion member, with the result that it deteriorates the cushioning effect of the cushion member and gives a poor seating touch to an occupant thereon. (b) A magnet with a great magnetic force is required in order that it can transmit a sufficient attractive force through the layer of the pile-type fastener so as to positively secure the fastener to the forming die.

SUMMARY OF THE INVENTION

It is a primary purpose of the present invention to provide a forming die for forming a foam cushion member integrally with a pile-type fastener which permits the formation of the cushion member integrally with the fastener without using the above-mentioned magnet for securing the fastener to a forming die.

In order to achieve the foregoing purpose, in accordance with the present invention, there is provided a forming die comprising a recessed groove formed in its internal walls, an engageable member to be removably engaged with either of male and female pile-type fasteners, and a base plate for resiliently securing the engageable member to the recessed groove of the forming die. The base plate per se may be made of an elastic material, or may be provided at its peripheral edge portions with an elastic member for resiliently securing the base plate to the inner surfaces of the recessed groove.

Accordingly, throughout the foaming steps of the cushion member, the pile-type fastener is kept secured within the forming die by virtue of its being engaged with the engageable member. The engageable member is secured to the recessed groove of the die by means of the resiliency of the base plate or the elastic member for the base plate.

Thus, there is no need to provide a permanent magnet for attractively securing the pile-fastener as in the conventional method, and the present invention eliminates the above-noted drawbacks in the conventional technique.

BRIEF DESCRIPTION OF THE DRAWINGS

FIG. 1 is a schematic view showing steps for forming a foam cushion member integrally with a pile-type fastener in accordance with the present invention;

DETAILED DESCRIPTION OF PREFERRED EMBODIMENTS OF THE INVENTION

Figure 2:
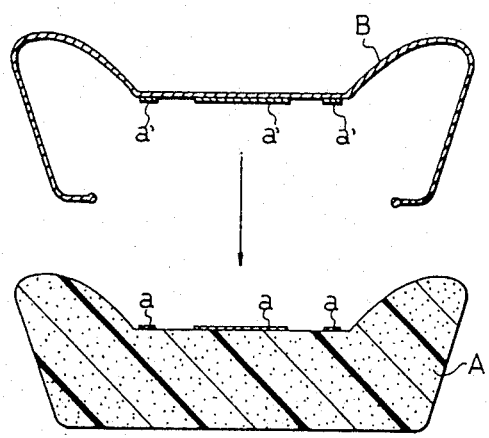
FIG. 2 is a sectional view of a foam cushion member to be produced by the method of the present invention and a top cover member which is to cover the cushion member.

Referring to FIG. 1, there is illustrated a process for forming a cushion member (A) integrally on its surface with a pile-type fastener (a), using a forming die (1) of the present invention.

At first, a brief description will be given with regard to such process: Firstly, a corresponding number of pile-type fasteners as indicated by reference character (a) are at their hook portions (a1) engaged with the respective engageable members (2). Next, a liquid form of polyurethane (5) is injected into the forming die (1), and then after closing airtight the die (1), the liquid form of polyurethane (5) is subjected to a foaming process. Thereafter, the forming die (1) is opened and the resultant foam product is removed away therefrom, whereupon obtained is the cushion member (A) with the pile-type fasteners (a) on its surface.

Now, the construction of the forming die (1) in accordance with the present invention will be described hereinafter.

In FIG. 1, reference numerals (2) and (3) represent the aforementioned engageable members and a base plate, respectively. Each of the engageable members (2) is provided with the base plate (3), and is such arranged in the forming die (1) that it is resiliently secured in a recessed groove (11) formed in the forming die (1) by means of the base plate (3) per se, which, in this case, is made of an elastic material, or by means of elastic members (4) provided on the peripheral ends of the base plate (3). The illustrated base plate (3) and elastic members (4) are respectively constructed of a rigid material such as a metallic plate or a hard plastic plate and of a rubber or soft plastic material. But, the base plate (3) may be of a rubber plate, in which case, there will be no need to provide the elastic members (4). The engageable member (2) may be fixed to the base plate by means of an adhesive or the like.

As for the engageable members (2), they should be constructed of a material capable of removable engagement with such pile-type fasteners (a) which are, for example, formed of a woven fabric, a knitted material or needle punched fabric.

Figure 3:
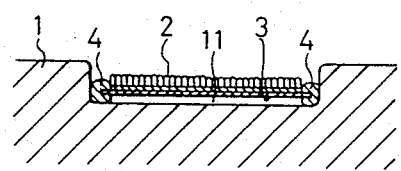
FIG. 3 is a sectional view of the principal portion in accordance with the present invention.
Figure 4:
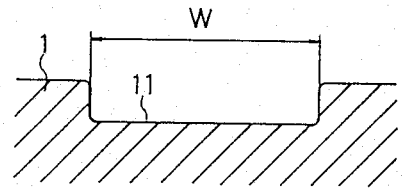
FIG. 4 is a sectional view of a recessed groove formed in a forming die.
Figure 5:
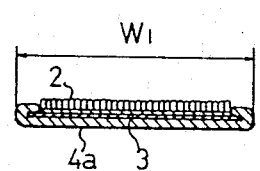
FIGS. 5 (A) and (B) are respectively a sectional view of a second embodiment of an engageable member and a base plate to be mounted in the recessed goove, and a sectional view of a third embodiment thereof.
Figure 5:
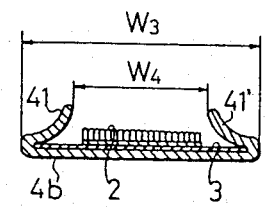

Referring now to FIGS. 3 through 5 (A)(B), the above-mentioned engageable members (2) and elastic members (4) will be described in detail as below.

In FIG. 3, illustrated is the state in which the engageable member (2) is secured within the recessed groove (11) of the forming die (1) shown in FIG. 1, prior to being engaged with one of the pile-type fasteners (a). On the back surface of the engageable member (2), fixed is the base plate (3) whose peripheral ends are provided with the elastic members (4). By reason of the elastic members (4) being resiliently secured to the inner surfaces of the recessed groove (11), the engageable member (2) is retained in the recessed groove (11).

In FIG. 4, there is shown the recessed groove (11) with no engageable member (2) and elastic members (4) therein. The recessed groove (11) is properly dimensioned at an optimum degree in terms of width (W) and depth.

FIGS. 5 (A) and (B) illustrates second and third embodiments of the engageable member (2) and elastic member (4) to be secured in the recessed groove (11), respectively.

In the second embodiment shown in FIG. 5 (A), there is provided an elastic member (4a) which extends over the entire bottom of a base plate (3) fixed to the engageable member (2), and turns over at the peripheral ends of the base plate (3). The width (W1) of those members in all are slightly greater than the aforementioned width (W) of the recessed groove (11), resilient, frictional contact of the elastic member (4a) with the inner surfaces of the groove (11).

In the third embodiment shown in FIG. 5 (B), provided is an elastic member (4b) so formed that projected portions (41)(41') extend from the peripheral ends of a base plate (3) in an upward direction (i.e. in a direction towards the opened side of the recessed groove (11), for the purpose of preventing the invasion of a liquid form of foam material into the above-mentioned pile-type fastener (a) which is to be engaged with an engageable member (2) fixed to the base plate (3). The width (W4) between the end portions of the projected portions (41)(41') is formed relatively narrower than the one (W1) shown in FIG. 5 (A), which permits the use of a smaller sized engageable member (2) and thus a smaller width of the pile-type fastener may be applied in the same forming die, thereby avoiding necessity of replacement of forming die. The total width (W3) is identical to the width (W1) shown in FIG. 5 (A).

For the above-discussed first, second and third embodiments as shown in FIGS. 3, 5 (A) and 5 (B), it may be arranged that the engageable member (2), base plate (3) and elastic member (4) are firmly secured in the recessed groove (11) so as to be unmoved and stayed therein while the pile-type fastener (a), which is in engagement with those elements during the forming process, is removable from them when taking out the resultant foam cushion member (A) from the forming die (1), or alternatively, such three elements may be so secured in the recessed groove (11) as to be removable together with the pile-type fastener (a) when the foam cushion member (A) is taken out from the die (1).

The above-described present invention is endowed with the undermentioned effects.

(1) Since the engageable member to be engaged with the pile-type fastener is secured in the forming die due to the resiliency of the base plate or elastic member, there is eliminated the provision of a magnet for securing the fastener to the die in the process of forming the cushion member integrally with the fastener. That is, there is no need to provide such magnetically attractable material as ferrous metallic material in the pile-type fastener. Thus, ordinary kinds of pile-type fasteners can readily be used in the present invention, and accordingly, there is nothing to impair the cushioning effect of the cushion member in contrast to the conventional forming die as stated before, and it is possible to form the cushion member with pile-type fastener at a lower cost.

(2) The fact that the engageable member is secured in the die by means of resiliency of elastic material without using a magnet makes it possible to reduce the costs involved, makes easier the securing of the engageable member in the forming die, and further permits much easier replacement of the engageable member.

The description above has been given of a preferred embodiment of the present invention, but it should be understood that the invention is not limited to the embodiment illustrated but various other replacements, modifications and additions may structurally be possible without departing from the scope and spirit of the appended claims for the invention.

What is claimed is:

1. A forming die for forming a vehicle seat foam cushion member integrally on its surface with at least one of a first pile-type fastener adapted to be engageable with at least one of a second pile-type fastener provided on a back surface of a top cover member associated with the seat, said forming die comprising:

at least one recessed groove formed in an inner wall of said forming die;
   a base plate frictionally secured in said recessed groove by resilient means; and,
   means integrally fixed to said base plate, which is releasably securable to pile of said pile-type fastener.

2. The forming die according to claim 1, wherein said base plate is formed of a metallic plate.

3. The forming die according to claim 1, wherein said resilient means of said base plate includes an elastic member at peripheral ends of said base plate which is resiliently contacted with the inner wall of said recessed groove.

4. The forming die according to claim 1, wherein said base plate is formed of a rubber plate.

5. The forming die according to claim 1, wherein said means integrally fixed to said base plate is formed of a material capable of removable engagement with said first pile-type fastener and having a loop-shaped fiber surface, which material is the one selected from the group of woven fabric, knitted material and needle punched fabric.

6. The forming die according to claim 1, wherein said means integrally fixed to said base plate is bonded to said base plate.

7. The forming die according to claim 3, wherein said elastic member of said base plate is so formed that its peripheral ends extend and project in the direction of the open side of said recessed groove, to thereby prevent the invasion of a liquid form of a formable material into said first pile-type fastener.

8. The forming die according to claim 1, wherein said base plate is formed of a hard plastic plate.

* * * * *